United States Patent
Deshpande et al.

(10) Patent No.: US 10,540,703 B2
(45) Date of Patent: Jan. 21, 2020

(54) VISUALIZATIONS FOR AIDING IN CO-LOCATING PRODUCTS BASED UPON ASSOCIATIONS

(71) Applicant: Wayfair LLC, Boston, MA (US)

(72) Inventors: Ajay A. Deshpande, White Plains, NY (US); Hongliang Fei, Millwood, NY (US); Arun Hampapur, Norwalk, CT (US); Xuan Liu, Yorktown Heights, NY (US)

(73) Assignee: Wayfair LLC, Boston, MA (US)

( * ) Notice: Subject to any disclaimer, the term of this patent is extended or adjusted under 35 U.S.C. 154(b) by 770 days.

(21) Appl. No.: 15/154,215

(22) Filed: May 13, 2016

(65) Prior Publication Data

US 2017/0330259 A1 Nov. 16, 2017

(51) Int. Cl.
G06Q 30/06 (2012.01)

(52) U.S. Cl.
CPC ..... *G06Q 30/0625* (2013.01); *G06Q 30/0639* (2013.01)

(58) Field of Classification Search
CPC .................................................. G06Q 30/0639
See application file for complete search history.

(56) References Cited

U.S. PATENT DOCUMENTS

| | | | | | |
|---|---|---|---|---|---|
| 8,620,707 B1* | 12/2013 | Belyi | ................... | G06Q 10/087 | |
| | | | | 705/28 | |
| 2015/0026606 A1* | 1/2015 | Hill | ....................... | G06F 3/0482 | |
| | | | | 715/760 | |
| 2015/0120717 A1* | 4/2015 | Kim | ....................... | G06F 16/335 | |
| | | | | 707/727 | |
| 2015/0294327 A1* | 10/2015 | Steves | ................ | G06Q 30/0224 | |
| | | | | 705/7.29 | |
| 2017/0228808 A1* | 8/2017 | Kumar | ................ | G06Q 30/0631 | |
| 2017/0323028 A1* | 11/2017 | Jonker | ................ | G06F 16/9024 | |

OTHER PUBLICATIONS

Nettleton et al., "Analysis of the user queries of an e-commerce bookstore in terms of the Library of Congress classification and key publishers", Dec. 2013, IR Information Research, vol. 18, No. 4, 20 pgs ("Nettleton"). (Year: 2013).*
NIST, "NIST Cloud Computing Program", http://csrc.nist.gov/groups/SNS/cloud-computing/index.html, Created on Nov. 15, 2010, Last updated on Mar. 2, 2016, 2 pages.
Egas, C. et al., "Determining Warehouse Storage Location Assignments Using Clustering Analysis", (IMHRC 2010), Milwaukee on Jun. 21-24, 2010 7 pages.
Chan, H. L., et al. "Assocation Rule Based Approach for Improving Operation Efficiency in a Randomized Warehouse", Proceedings of the 2011 International Conference on Industrial Engineering and Operations Management Kuala Lumpur, Malaysia, (Jan. 22-24, 2011), pp. 704-710.
"Force-Directed Graph", http://bl.ocks.org/mbostock/4062045, printed on: Apr. 13, 2016, 6 pages.

* cited by examiner

*Primary Examiner* — A. Hunter Wilder (74) *Attorney, Agent, or Firm* — Wolf, Greenfield & Sacks, P.C.

(57) ABSTRACT

The present disclosure relates generally to the field of product supply networks (e.g., for order fulfillment and inventory control). In one specific example, mechanisms are provided for presenting visualizations to aid in co-locating two or more products in the same location (e.g., at a common order fulfillment facility) based upon associations between the products. In various embodiments, systems, methods and computer program products are provided.

17 Claims, 8 Drawing Sheets

```
┌─────────────────────────────────────────────────────────────┐
│ OBTAINING BY A PROCESSOR SHOPPING DATA FOR A PLURALITY      │
│ OF PRODUCTS, THE SHOPPING DATA COMPRISING FOR EACH OF       │
│ THE PLURALITY OF PRODUCTS AN IDENTIFICATION OF EACH         │
│ OTHER PRODUCT OF THE PLURALITY OF PRODUCTS, IF ANY,         │
│ WHICH HAD BEEN ORDERED ALONG WITH THE PRODUCT               │
│                           401                               │
└─────────────────────────────────────────────────────────────┘
                              │
                              ▼
┌─────────────────────────────────────────────────────────────┐
│ DETERMINING BY THE PROCESSOR FOR EACH OF THE PLURALITY      │
│ OF PRODUCTS, BASED AT LEAST IN PART UPON THE SHOPPING       │
│ DATA, AN AFFINITY OF THE PRODUCT TO EACH OTHER PRODUCT      │
│ OF THE PLURALITY OF PRODUCTS, IF ANY, WHICH HAD BEEN        │
│ ORDERED ALONG WITH THE PRODUCT                              │
│                           403                               │
└─────────────────────────────────────────────────────────────┘
                              │
                              ▼
┌─────────────────────────────────────────────────────────────┐
│ GENERATING BY THE PROCESSOR A PRODUCT GRAPH, THE            │
│ PRODUCT GRAPH COMPRISING: (A) PLURALITY OF PRODUCT          │
│ INDICIA, WHEREIN EACH OF THE PLURALITY OF PRODUCT INDICIA   │
│ CORRESPONDS TO ONE OF THE PLURALITY OF PRODUCTS; AND        │
│ (B) A PLURALITY OF AFFINITY INDICIA, WHEREIN EACH OF THE    │
│ PLURALITY OF AFFINITY INDICIA CORRESPONDS TO ONE OF THE     │
│ DETERMINED AFFINITIES AND WHEREIN EACH OF THE PLURALITY     │
│ OF AFFINITY INDICIA CONNECTS TWO OF THE PLURALITY OF        │
│ PRODUCT INDICIA CORRESPONDING TO TWO OF THE PLURALITY       │
│ OF PRODUCTS THAT HAD BEEN ORDERED TOGETHER                  │
│                           405                               │
└─────────────────────────────────────────────────────────────┘
                              │
                              ▼
┌─────────────────────────────────────────────────────────────┐
│      DISPLAYING BY THE PROCESSOR THE PRODUCT GRAPH          │
│                           407                               │
└─────────────────────────────────────────────────────────────┘
```

VISUALIZATIONS FOR AIDING IN CO-LOCATING PRODUCTS BASED UPON ASSOCIATIONS

BACKGROUND

The present disclosure relates generally to the field of product supply networks (e.g., for order fulfillment and inventory control). In one specific example, mechanisms are provided for presenting visualizations to aid in co-locating two or more products in the same location (e.g., at a common order fulfillment facility) based upon associations between the products. In various embodiments, systems, methods and computer program products are provided.

In a conventional technique, inventory for multiple products is typically placed according to an estimate of future sales. This conventional technique does not take into account affinities among products due, for example, to online shopping basket associations.

In this regard, if two or more products are ordered as part of the same order and the products are located in different locations (e.g., warehouses), there is an extra shipping cost either in splitting the order or consolidating the order in a single location.

SUMMARY

Visualization mechanisms are provided to aid in co-locating inventory for two or more products at the same location based on the affinity between products (e.g., through online shopping basket associations). This can reduce the need for splitting a future order or consolidating a future order in a single location.

In one embodiment, a computer-implemented method for recommending co-location of at least two products is provided, the method comprising: obtaining by a processor shopping data for a plurality of products, the shopping data comprising for each of the plurality of products an identification of each other product of the plurality of products, if any, which had been ordered along with the product; determining by the processor for each of the plurality of products, based at least in part upon the shopping data, an affinity of the product to each other product of the plurality of products, if any, which had been ordered along with the product; generating by the processor a product graph, the product graph comprising: (a) plurality of product indicia, wherein each of the plurality of product indicia corresponds to one of the plurality of products; and (b) a plurality of affinity indicia, wherein each of the plurality of affinity indicia corresponds to one of the determined affinities and wherein each of the plurality of affinity indicia connects two of the plurality of product indicia corresponding to two of the plurality of products that had been ordered together; and displaying by the processor the product graph.

In another embodiment, a computer readable storage medium, tangibly embodying a program of instructions executable by a computer for recommending co-location of at least two products is provided, the program of instructions, when executing, performing the following steps: obtaining shopping data for a plurality of products, the shopping data comprising for each of the plurality of products an identification of each other product of the plurality of products, if any, which had been ordered along with the product; determining for each of the plurality of products, based at least in part upon the shopping data, an affinity of the product to each other product of the plurality of products, if any, which had been ordered along with the product; generating a product graph, the product graph comprising: (a) plurality of product indicia, wherein each of the plurality of product indicia corresponds to one of the plurality of products; and (b) a plurality of affinity indicia, wherein each of the plurality of affinity indicia corresponds to one of the determined affinities and wherein each of the plurality of affinity indicia connects two of the plurality of product indicia corresponding to two of the plurality of products that had been ordered together; and displaying the product graph.

In another embodiment, a computer-implemented system for recommending co-location of at least two products is provided, the system comprising: a processor; and a memory storing computer readable instructions that, when executed by the processor, implement: obtaining shopping data for a plurality of products, the shopping data comprising for each of the plurality of products an identification of each other product of the plurality of products, if any, which had been ordered along with the product; determining for each of the plurality of products, based at least in part upon the shopping data, an affinity of the product to each other product of the plurality of products, if any, which had been ordered along with the product; generating a product graph, the product graph comprising: (a) plurality of product indicia, wherein each of the plurality of product indicia corresponds to one of the plurality of products; and (b) a plurality of affinity indicia, wherein each of the plurality of affinity indicia corresponds to one of the determined affinities and wherein each of the plurality of affinity indicia connects two of the plurality of product indicia corresponding to two of the plurality of products that had been ordered together; and displaying the product graph

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

In various embodiments, visualization mechanisms are provided to recommend co-location of two or more high-velocity stock keeping units, or SKUs (that is, products that sell rapidly and/or in large volume) in the same location based on association rule analysis of orders (e.g., real-time orders and/or historical orders).

For the purposes of describing and claiming the present invention the term "online shopping basket" is intended to refer to a mechanism for receiving orders for a product online (such as, for example, at a website).

For the purposes of describing and claiming the present invention the term "order fulfillment facility" is intended to refer to a physical location from which orders are fulfilled. Such an order fulfillment facility may be, for example, a warehouse, a distribution center ("DC") or an electronic fulfillment center ("EFC").

For the purposes of describing and claiming the present invention the term "SKU" (or stock keeping unit) is intended to refer to an identification, typically alphanumeric, of a particular product that allows the product to be tracked for inventory purposes.

For the purposes of describing and claiming the present invention the term "real-time" (such as used in the context of "real-time data") is intended to refer to occurring substantially contemporaneously with an event (but not necessarily at precisely the exact same time).

For the purposes of describing and claiming the present invention the term "alphanumeric sequence" is intended to refer to text comprising one or more letters, one or more numbers or any combination thereof.

As described herein, mechanisms are provided that leverage graph visualizations to quickly identify which items need to be co-located for optimal efficiency.

Figure 1:
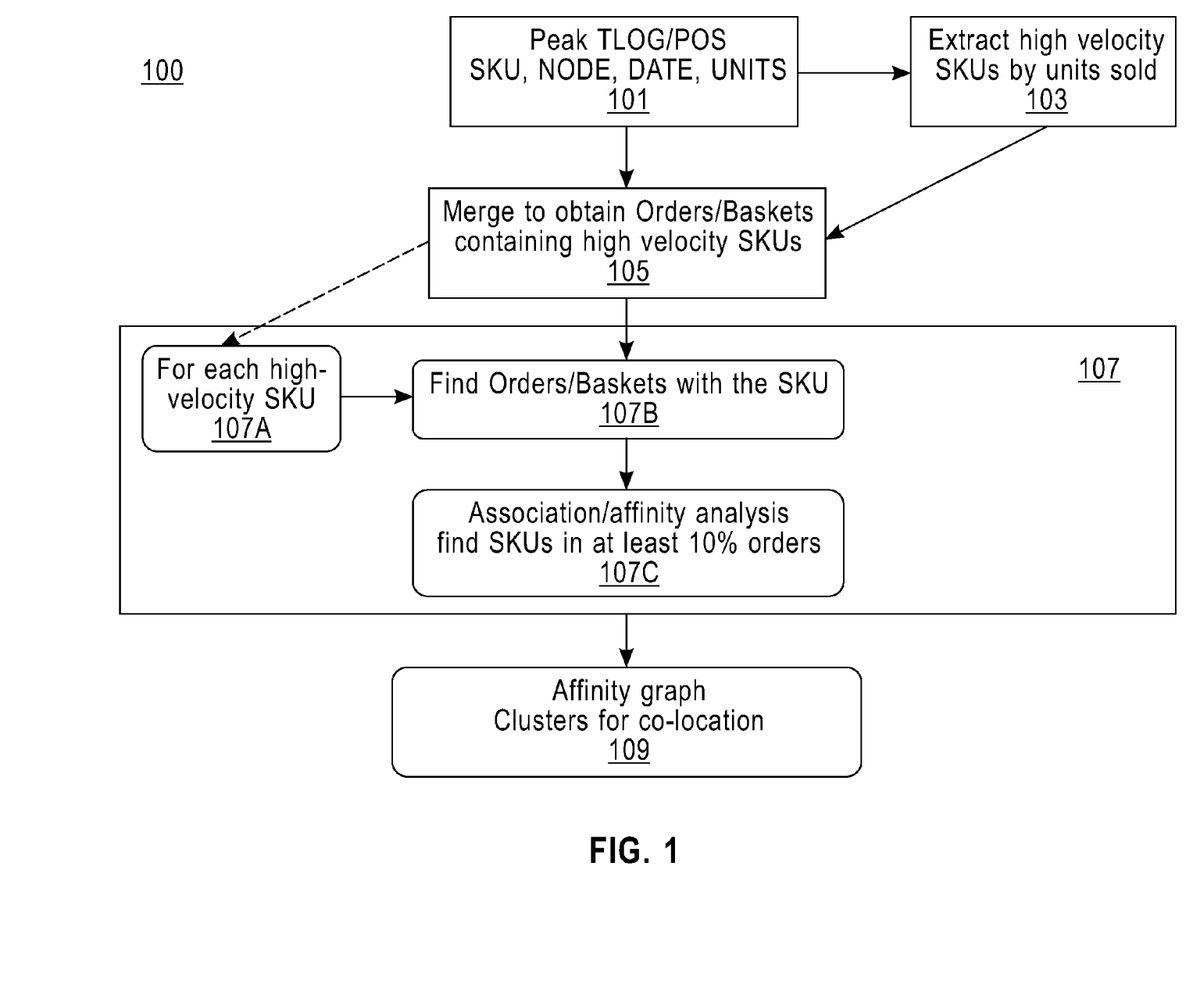
FIG. 1 depicts a block diagram of an affinity determination process according to one example implementation of an embodiment of the disclosure.

Referring now to FIG. 1, depicted is a block diagram of an affinity determination process 100 according to one example implementation of an embodiment of the disclosure (this affinity determination process may comprise an affinity analysis of high-velocity SKUs for inventory co-location decisions). More particularly, as seen, block 101 corresponds to the historical sales data at the level of node, date, item and units. In block 103 this data is aggregated and processed at different date/node levels to identify top selling items where SKUs are ranked by the quantities sold. At block 105 data regarding these top selling items is merged with the ecommerce order data to obtain orders containing top SKUs. In one specific example, one or more retailers may maintain the historical sales data and the ecommerce order data in the same sales database. In another specific example, one or more retailers may maintain the historical sales data and the ecommerce order data in a plurality of data sources (e.g., a plurality of databases).

Still referring to FIG. 1, block 107 includes blocks 107A, 107B and 107C. Block 107A receives input from block 105. In addition block 107B receives input from block 105 and block 107A. Further, block 107C receives input from block 107B. Finally, the output of block 107 is block 109 (which corresponds to an "Affinity graph" having clusters for identifying recommended co-location.

Figure 2:
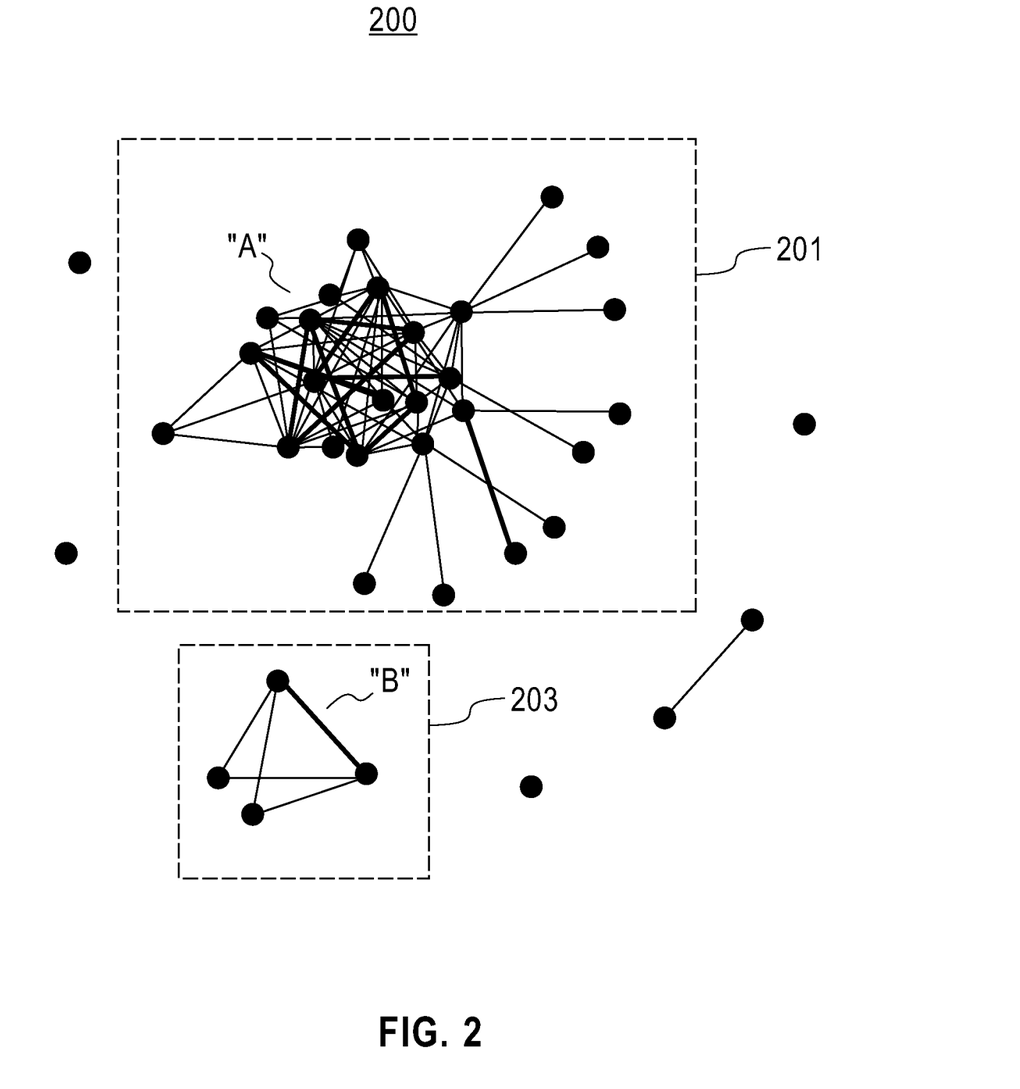
FIG. 2 depicts one affinity graph example according to an embodiment of the disclosure.

Referring now to FIG. 2, depicted is one affinity graph example (of the top 20 SKUs ranked by the number of units sold.) according to an embodiment of the disclosure. As seen in this FIG. 2, a visualization tool is provided wherein affinities among products is presented as a graph 200. Each "dot" (that is, node or vertex) in graph 200 represents a product (or SKU). Each high affinity between products in graph 200 is represented as a line (link or edge). Further, similar types of products are placed together in the same location on the graph 200 as clusters (see, e.g., cluster "A" containing, for example, bath-related items and cluster "B" containing, for example, kitchen appliances). In one specific example, each cluster may be bounded by certain x-y coordinates of the display. In another specific example, each cluster may be bounded by a bounding rectangle, such as bounding rectangle 201 and bounding rectangle 203 (bounding rectangle 201 and bounding rectangle 203 are show in FIG. 2 as dashed lines; these dashed lines are for illustration purposes only and are not necessarily displayed in the graph 200 in a visual manner). In another specific example, the various SKUs are displayed with associated identifying indicia (not shown). In another example, each displayed SKU may be color-coded (not shown) for identification.

Figure 3:
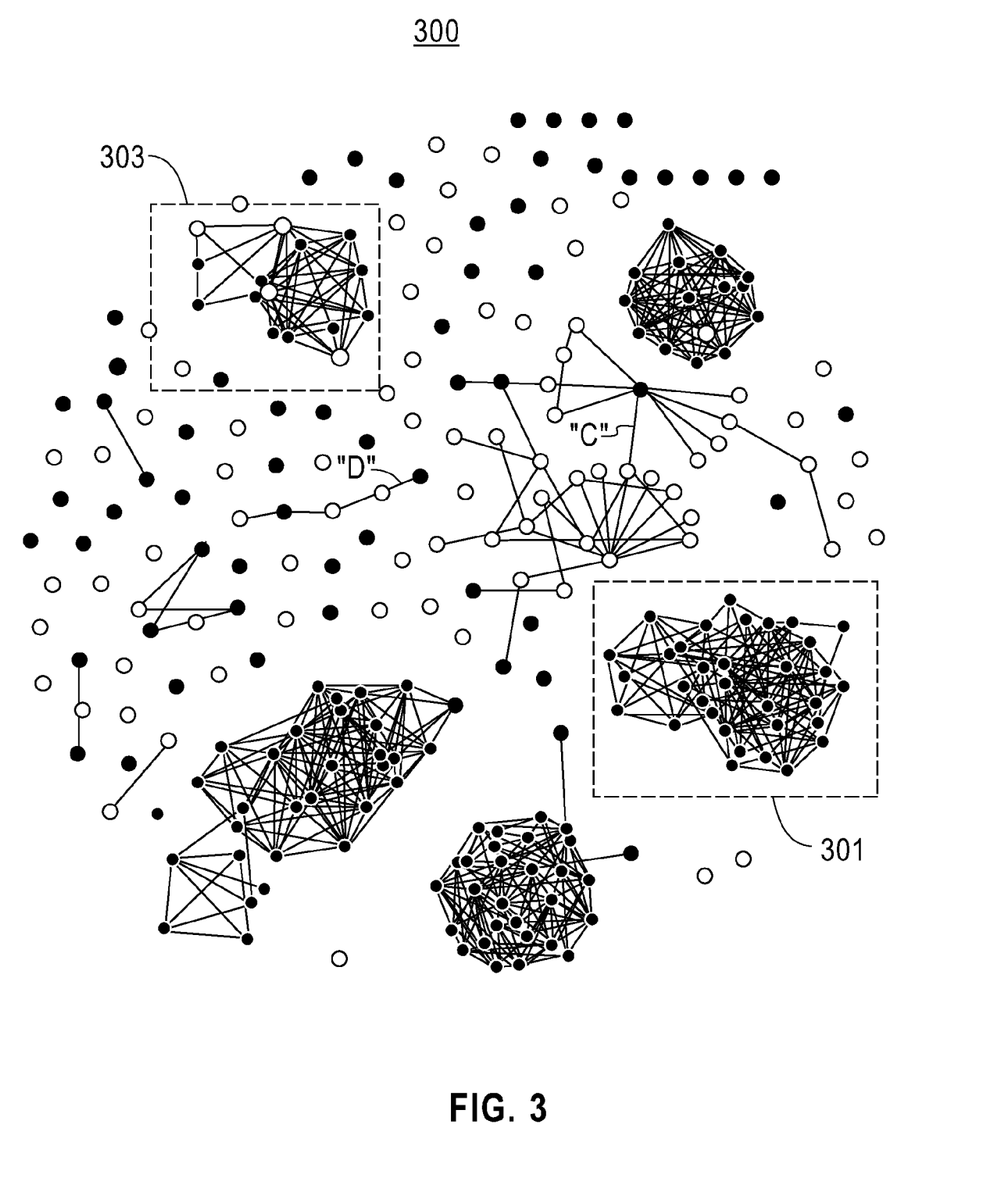
FIG. 3 depicts another affinity graph example according to an embodiment of the disclosure.

Referring now to FIG. 3, depicted is another affinity graph example according to an embodiment of the disclosure. As seen in this FIG. 3, a visualization tool is provided wherein affinities among products is presented as a graph 300 (which may be used, for example, in helping to evaluate and/or recommend product placements). Each "dot" (that is, node or vertex) in graph 300 represents a product (or SKU). Each affinity between products in graph 300 is represented as a line (link or edge). In this example, each dot is presented with a color depending upon the location of the product, e.g., a location of a warehouse or other product distribution facility at which the product resides (in this example, the black and white FIG. 3 does not show "colors" but, rather, a number of lighter and darker dots; it is to be understood, however, that any desired number of colors may be utilized). A link between two dots of different colors indicates bad placement and possible order splits (see, for example, the line labeled "C" between the lighter and darker colored dots; in another example, see the line labeled "D" between the lighter and darker colored dots). Thus, any discrepancies in the product placement can be easily identified. In one specific example, the color of each location (that is, location where a product resides) is different from the color of each other location (that is, location where a product resides). In another specific example, each cluster may be bounded by certain x-y coordinates of the display. In another specific example, each cluster may be bounded by a bounding rectangle, such as bounding rectangle 301 and bounding rectangle 303 (bounding rectangle 301 and bounding rectangle 303 are show in FIG. 3 as dashed lines; these dashed lines are for illustration purposes only and are not necessarily displayed in the graph 300 in a visual manner).

Figure 4:
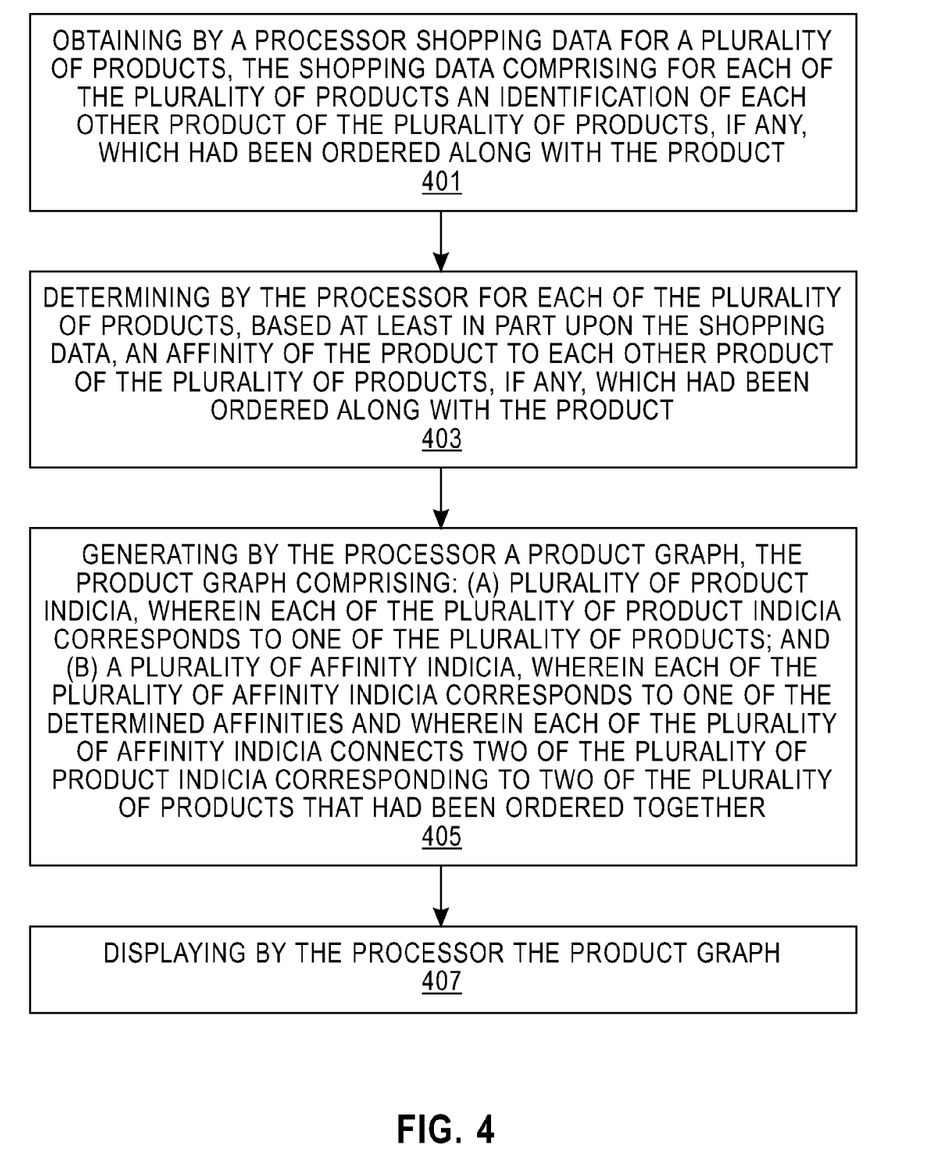
FIG. 4 depicts a flowchart of a method according to an embodiment of the disclosure.

As described herein, in one example, a visualization graph is drawn such that each node is an item and a connection between two nodes indicates the high affinity between the products. In one specific example, the visualization may be implemented utilizing a force directed graphing tool (see, e.g., the tool found at http://bl.ocks.org/mbostock/4062045). Such a force directed graph implemented using this tool permits the dragging of individual "clusters" in order to separate them. In this context, a cluster indicates a collection of nodes (items) "highly" connected (e.g., there are a number of lines or arcs connecting each other in the cluster and very few lines or arcs actually go out of the cluster). In practice, many orders will contain bundles of items from a particular cluster (because of the high affinity of the items in the cluster). If such items (that is, items often bundled together in a particular order) are placed in different locations, then during fulfillment the order will be split in multiple split packages (increasing the shipping cost). The visual techniques described herein help to identify which items can be physically located together (to minimize shipping costs). In one specific example, the visualization graph may be in the form of a 3-dimensional representation Referring now to FIG. 4, a method for recommending co-location of at least two products is provided. As seen in this FIG. 4, the method of this embodiment comprises: at 401—obtaining by a processor shopping data for a plurality of products, the shopping data comprising for each of the plurality of products an identification of each other product of the plurality of products, if any, which had been ordered along with the product; at 403—determining by the processor for each of the plurality of products, based at least in part upon the shopping data, an affinity of the product to each other product of the plurality of products, if any, which had been ordered along with the product; at 405—generating by the processor a product graph, the product graph comprising: (a) plurality of product indicia (such as, for example, a "dot" of FIG. 2 or a "dot" of FIG. 3), wherein each of the plurality of product indicia corresponds to one of the plurality of products; and (b) a plurality of affinity indicia (such as, for example, a "line" of FIG. 2 or a "line" of FIG. 3), wherein each of the plurality of affinity indicia corresponds to one of the determined affinities and wherein each of the plurality of affinity indicia connects two of the plurality of product indicia corresponding to two of the plurality of products that had been ordered together; and at 407—displaying by the processor the product graph.

Figure 5:
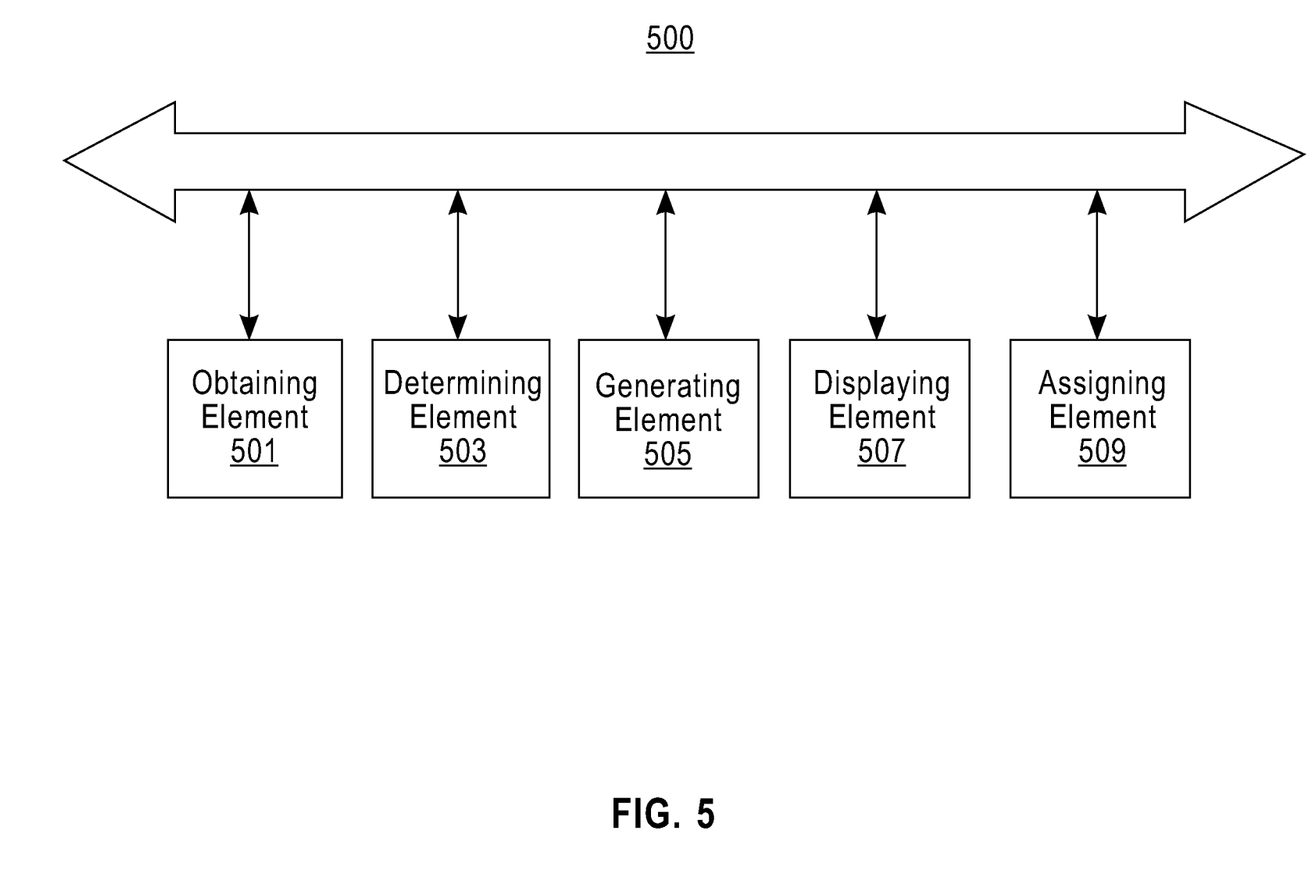
FIG. 5 depicts a block diagram of a system according to an embodiment of the disclosure.

Referring now to FIG. 5, in another embodiment, a system 500 for recommending co-location of at least two products is provided. This system may include a processor (not shown); and a memory (not shown) storing computer readable instructions that, when executed by the processor, implement: an obtaining element 501 configured to obtain shopping data for a plurality of products, the shopping data comprising for each of the plurality of products an identification of each other product of the plurality of products, if any, which had been ordered along with the product; a determining element 503 configured to determine for each of the plurality of products, based at least in part upon the shopping data, an affinity of the product to each other product of the plurality of products, if any, which had been ordered along with the product; a generating element 505 configured to generate a product graph, the product graph comprising: (a) plurality of product indicia (such as, for example, a "dot" of FIG. 2 or a "dot" of FIG. 3), wherein each of the plurality of product indicia corresponds to one of the plurality of products; and (b) a plurality of affinity indicia (such as, for example, a "line" of FIG. 2 or a "line" of FIG. 3), wherein each of the plurality of affinity indicia corresponds to one of the determined affinities and wherein each of the plurality of affinity indicia connects two of the plurality of product indicia corresponding to two of the plurality of products that had been ordered together; a displaying element 507 configured to display the product graph. In addition, as seen, system 500 further comprises an assigning element 509 configured to assign each of the plurality of products into one of a plurality of clusters, wherein each of the clusters corresponds to a type of product.

In one example, communication between and among the various components of FIG. 5 may be bi-directional. In another example, the communication may be carried out via the Internet, an intranet, a local area network, a wide area network and/or any other desired communication channel(s). In another example, each of the components may be operatively connected to each of the other components. In another example, some or all of these components may be implemented in a computer system of the type shown in FIG. 6.

Figure 6:
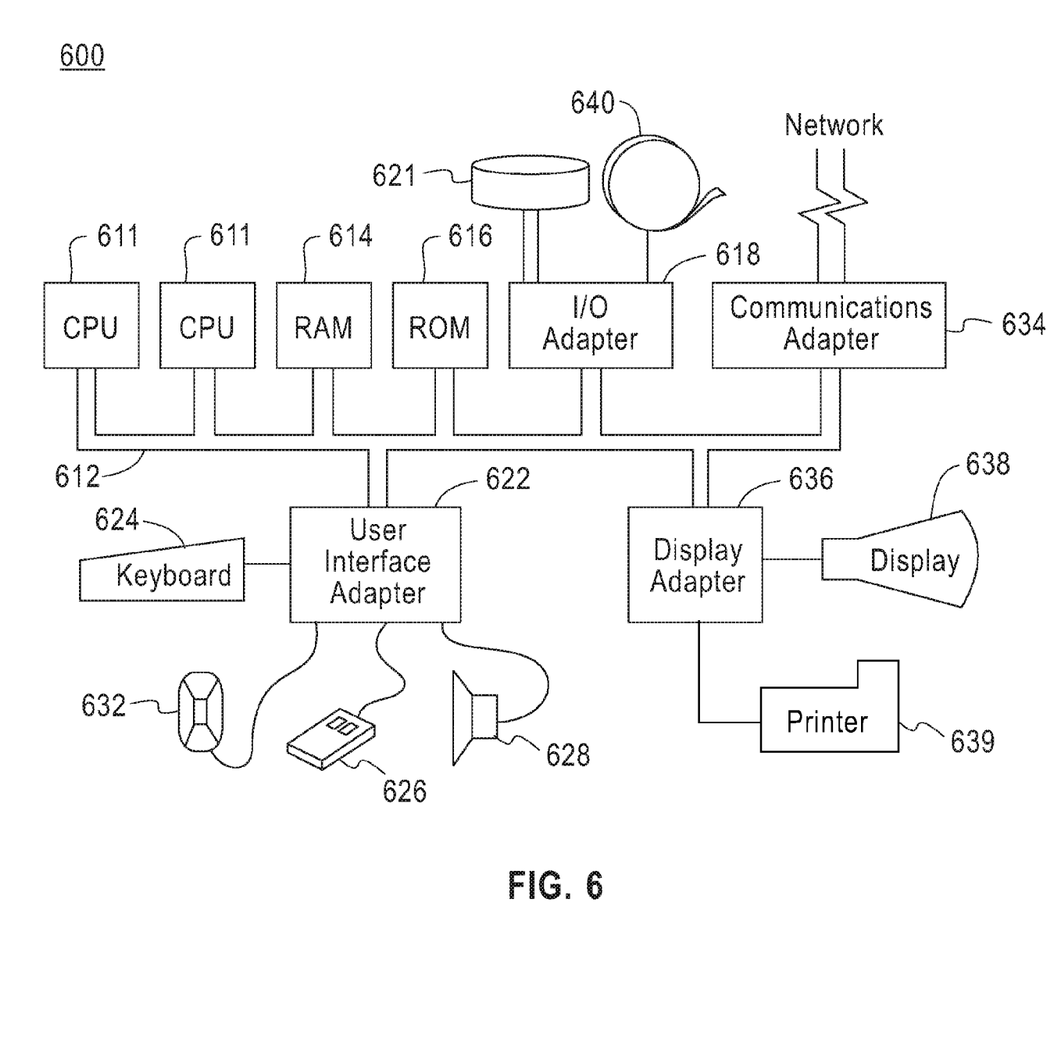
FIG. 6 depicts a block diagram of a system according to an embodiment of the disclosure.

Referring now to FIG. 6, this figure shows a hardware configuration of computing system 600 according to an embodiment of the present invention. As seen, this hardware configuration has at least one processor or central processing unit (CPU) 611. The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communications adapter 634 for connecting the system 600 to a data processing network, the Internet, an Intranet, a local area network (LAN), etc., and a display adapter 636 for connecting the bus 612 to a display device 638 and/or printer 639 (e.g., a digital printer or the like).

As described herein, mechanisms are provided for use in connection with order fulfillment and inventory management (e.g., retail, catalog, online).

As described herein, mechanisms provide for the co-location of two or more products in the same location based on association rule analysis of historical and/or real-time online sales data. Further, a visualization tool is also provided that quickly helps to identify non-co-located products which occur together frequently in a single online shopping basket.

As described herein, various embodiments may be applied in the context of high-velocity SKUs in online orders which are fulfilled from a few select locations (e.g. regional distribution centers).

In one embodiment, a computer-implemented method for recommending co-location of at least two products is provided, the method comprising: obtaining by a processor shopping data for a plurality of products, the shopping data comprising for each of the plurality of products an identification of each other product of the plurality of products, if any, which had been ordered along with the product; determining by the processor for each of the plurality of products, based at least in part upon the shopping data, an affinity of the product to each other product of the plurality of products, if any, which had been ordered along with the product; generating by the processor a product graph, the product graph comprising: (a) plurality of product indicia, wherein each of the plurality of product indicia corresponds to one of the plurality of products; and (b) a plurality of affinity indicia, wherein each of the plurality of affinity indicia corresponds to one of the determined affinities and wherein each of the plurality of affinity indicia connects two of the plurality of product indicia corresponding to two of the plurality of products that had been ordered together; and displaying by the processor the product graph.

In one example, the product graph is generated such that each of the plurality of product indicia corresponding to a given product is visually the same as one another and such that each of the plurality of product indicia corresponding to the given product is visually distinct from each of the plurality of product indicia corresponding to another product.

In another example, each of the plurality of product indicia is visually distinct from each of the plurality of product indicia corresponding to another product based upon each of the plurality of product indicia being displayed using at least one of: (a) a certain color; (b) a certain shape; (c) a certain alphanumeric sequence; and (d) any combination thereof.

In another example, the method further comprises: assigning by the processor each of the plurality of products into one of a plurality of clusters represented in three-dimensions, wherein each of the clusters corresponds to a type of product; and assigning by the processor to each of the clusters a bounding rectangle defined by two-dimensional x-y display coordinates; wherein the product graph is generated such that each of the plurality of product indicia in the product graph is displayed in a respective cluster within the bounding rectangle of the respective cluster.

In another example: the shopping data further comprises for each of the plurality of products an identification of an order fulfillment facility from where an order for the product was fulfilled; and the product graph is generated such that each of the plurality of product indicia is displayed in such a manner as to identify the order fulfillment facility from where the order for the corresponding product was fulfilled.

In another example, each of the plurality of product indicia is displayed in such a manner as to identify the order fulfillment facility from where the order for the corresponding product was fulfilled by being displayed using at least one of: (a) a certain color; (b) a certain shape; (c) a certain alphanumeric sequence; and (d) any combination thereof.

In another example, each order fulfillment facility is represented using at least one of: (a) a distinct color; (b) a distinct shape; (c) a distinct alphanumeric sequence; and (d) any combination thereof.

In another example, the shopping data comprises data obtained from a plurality of online shopping baskets.

In another example, each of the plurality of products is represented as a respective SKU.

In another example, the determining for each of the plurality of products an affinity of the product to each other product of the plurality of products comprises determining the affinity in response to one product being ordered along with another product more than a threshold number of times.

In another example, at least one of: (a) the threshold number of times is an absolute value across a plurality of different orders; (b) the threshold number of times is a percentage value relative to a total number of different orders; and (c) any combination thereof.

In another example, the shopping data comprises at least one of: (a) historic shopping data; (b) real-time shopping data and (c) any combination thereof.

In another embodiment, a computer readable storage medium, tangibly embodying a program of instructions executable by a computer for recommending co-location of at least two products is provided, the program of instructions, when executing, performing the following steps: obtaining shopping data for a plurality of products, the shopping data comprising for each of the plurality of products an identification of each other product of the plurality of products, if any, which had been ordered along with the product; determining for each of the plurality of products, based at least in part upon the shopping data, an affinity of the product to each other product of the plurality of products, if any, which had been ordered along with the product; generating a product graph, the product graph comprising: (a) plurality of product indicia, wherein each of the plurality of product indicia corresponds to one of the plurality of products; and (b) a plurality of affinity indicia, wherein each of the plurality of affinity indicia corresponds to one of the determined affinities and wherein each of the plurality of affinity indicia connects two of the plurality of product indicia corresponding to two of the plurality of products that had been ordered together; and displaying the product graph.

In one example: the product graph is generated such that each of the plurality of product indicia corresponding to a given product is visually the same as one another and such that each of the plurality of product indicia corresponding to the given product is visually distinct from each of the plurality of product indicia corresponding to another product; and each of the plurality of product indicia is visually distinct from each of the plurality of product indicia corresponding to another product based upon each of the plurality of product indicia being displayed using at least one of: (a) a certain color; (b) a certain shape; (c) a certain alphanumeric sequence; and (d) any combination thereof.

In another example: the program of instructions, when executing, further performs assigning each of the plurality of products into one of a plurality of clusters represented in three-dimensions and assigning to each of the clusters a bounding rectangle defined by two-dimensional x-y display coordinates; wherein each of the clusters corresponds to a type of product; and wherein the product graph is generated such that each of the plurality of product indicia in the product graph is displayed in a respective cluster within the bounding rectangle of the respective cluster.

In another example: the shopping data further comprises for each of the plurality of products an identification of an order fulfillment facility from where an order for the product was fulfilled; the product graph is generated such that each of the plurality of product indicia is displayed in such a manner as to identify the order fulfillment facility from where the order for the corresponding product was fulfilled; each of the plurality of product indicia is displayed in such a manner as to identify the order fulfillment facility from where the order for the corresponding product was fulfilled by being displayed using at least one of: (a) a certain color; (b) a certain shape; (c) a certain alphanumeric sequence; and (d) any combination thereof; and each order fulfillment facility is represented using at least one of: (a) a distinct color; (b) a distinct shape; (c) a different alphanumeric sequence; and (d) any combination thereof.

In another embodiment, a computer-implemented system for recommending co-location of at least two products is provided, the system comprising: a processor; and a memory storing computer readable instructions that, when executed by the processor, implement: obtaining shopping data for a plurality of products, the shopping data comprising for each of the plurality of products an identification of each other product of the plurality of products, if any, which had been ordered along with the product; determining for each of the plurality of products, based at least in part upon the shopping data, an affinity of the product to each other product of the plurality of products, if any, which had been ordered along with the product; generating a product graph, the product graph comprising: (a) plurality of product indicia, wherein each of the plurality of product indicia corresponds to one of the plurality of products; and (b) a plurality of affinity indicia, wherein each of the plurality of affinity indicia corresponds to one of the determined affinities and wherein each of the plurality of affinity indicia connects two of the plurality of product indicia corresponding to two of the plurality of products that had been ordered together; and displaying the product graph In one example: the product graph is generated such that each of the plurality of product indicia corresponding to a given product is visually the same as one another and such that each of the plurality of product indicia corresponding to the given product is visually distinct from each of the plurality of product indicia corresponding to another product; and each of the plurality of product indicia is visually distinct from each of the plurality of product indicia corresponding to another product based upon each of the plurality of product indicia being displayed using at least one of: (a) a certain color; (b) a certain shape; (c) a certain alphanumeric sequence; and (d) any combination thereof.

In another example: the computer readable instructions, when executed by the processor, further perform assigning each of the plurality of products into one of a plurality of clusters represented in three-dimensions and assigning to each of the clusters a bounding rectangle defined by two-dimensional x-y display coordinates; wherein each of the clusters corresponds to a type of product; and wherein the product graph is generated such that each of the plurality of product indicia in the product graph is displayed in a respective cluster within the bounding rectangle of the respective cluster.

In another example: the shopping data further comprises for each of the plurality of products an identification of an order fulfillment facility from where an order for the product was fulfilled; the product graph is generated such that each of the plurality of product indicia is displayed in such a manner as to identify the order fulfillment facility from where the order for the corresponding product was fulfilled; each of the plurality of product indicia is displayed in such a manner as to identify the order fulfillment facility from where the order for the corresponding product was fulfilled by being displayed using at least one of: (a) a certain color; (b) a certain shape; (c) a certain alphanumeric sequence; and (d) any combination thereof; and each order fulfillment facility is represented using at least one of: (a) a distinct color; (b) a distinct shape; (c) a distinct alphanumeric sequence; and (d) any combination thereof.

In other examples, any steps described herein may be carried out in any appropriate desired order.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
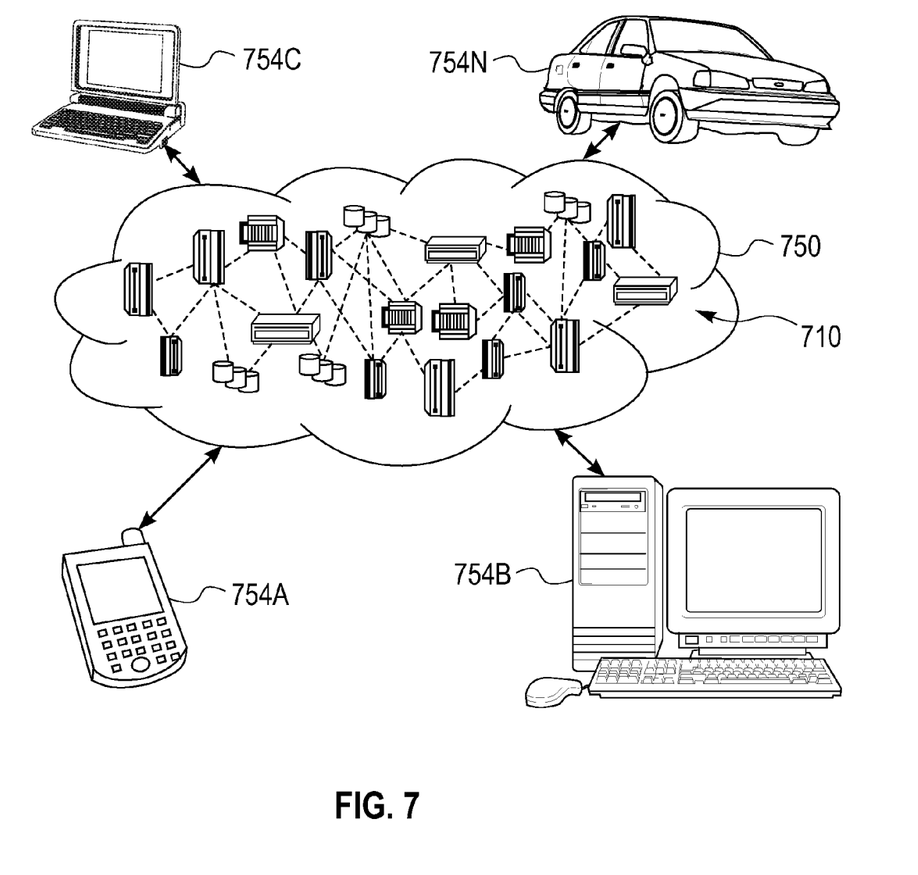
FIG. 7 depicts a cloud computing environment according to an embodiment of the disclosure.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
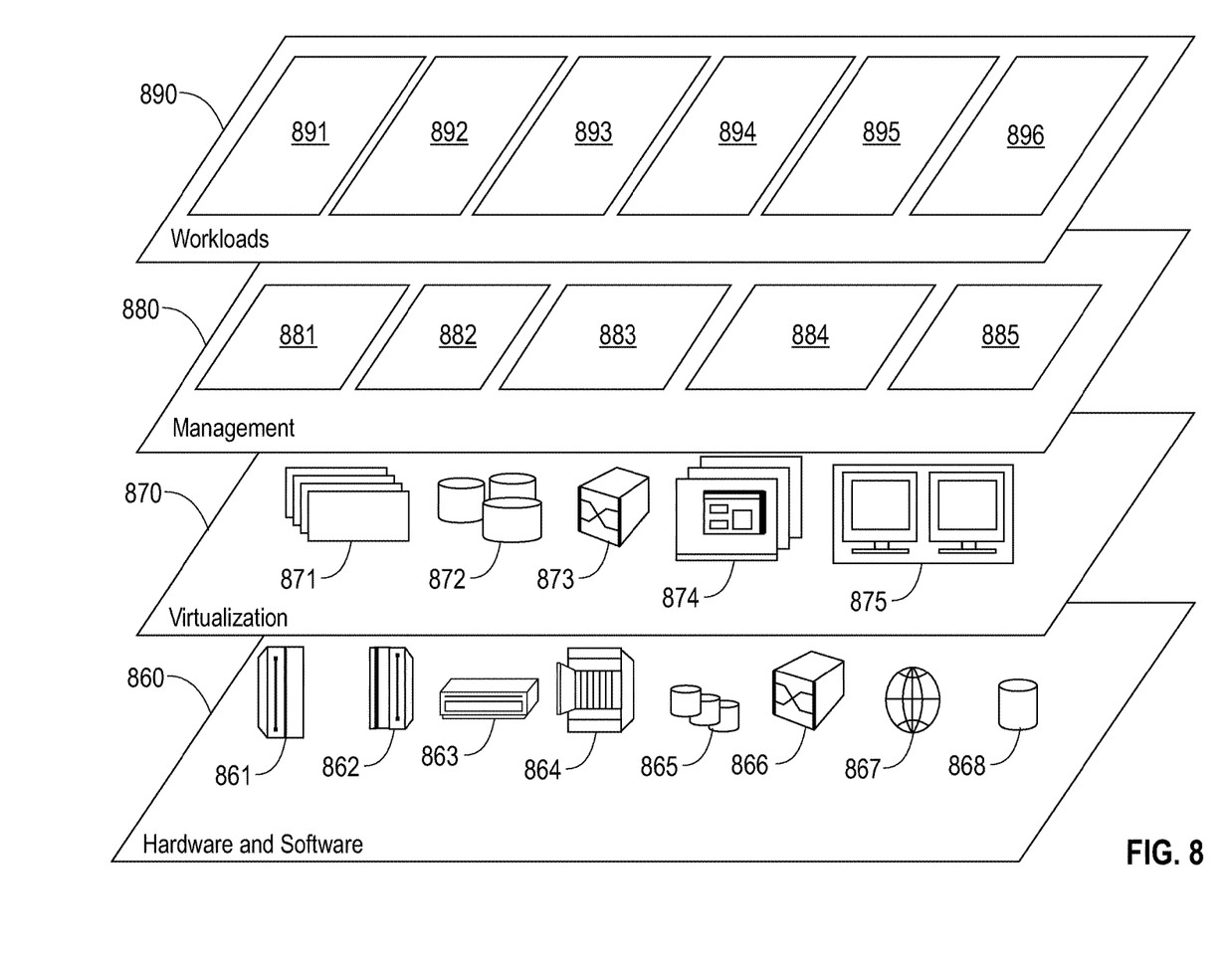
FIG. 8 depicts abstraction model layers according to an embodiment of the disclosure.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and visualizations to aid in co-locating two or more products in the same location 896.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for aiding co-location of at least two products, the method comprising:
   obtaining, by a processor, shopping data for a plurality of products, the shopping data comprising at least for each of the plurality of products an identification of each other product of the plurality of products, if any, which had been ordered along with the product;
   determining, by the processor, for each of the plurality of products, based at least in part upon the shopping data, an affinity of the product to each other product of the plurality of products, if any, which had been ordered along with the product;
   generating, by the processor, a product graph, the product graph comprising at least: (a) a plurality of product indicia, wherein each of the plurality of product indicia corresponds to one of the plurality of products, each of the plurality of product indicia having at least a visual attribute indicative of a location, wherein a different location is represented with a different visual attribute; and (b) a plurality of affinity indicia, wherein each of the plurality of affinity indicia corresponds to one of the determined affinities and wherein each of the plurality of affinity indicia connects two of the plurality of product indicia corresponding to two of the plurality of products that had been ordered together;
   assigning, by the processor, each of the plurality of products into one of a plurality of clusters represented in three-dimensions, wherein each of the clusters corresponds to a type of product;
   causing, by the processor utilizing a force directed graphing tool, dragging of some of the plurality of clusters to separate the plurality of clusters;
   assigning, by the processor, to each of the clusters a bounding rectangle defined by two-dimensional x-y display coordinates, wherein the product graph is generated such that each of the plurality of product indicia in the product graph is displayed in a respective cluster within the bounding rectangle of the respective cluster;
   causing, by the processor, displaying of the product graph, wherein a presence of an affinity indicia that connects two of the plurality of product indicia, representing the at least two products, having different visual attributes from one another visually signals an order split, wherein the product graph shows the plurality of product indicia with edges linking at least some of the plurality of product indicia; and
   aiding, by the processor, in co-locating of the at least two products of the plurality of products in an order fulfillment facility based on the presence of the affinity indicia.

2. The method of claim 1, wherein the product graph is generated such that each of the plurality of product indicia corresponding to a given product is visually the same as one another and such that each of the plurality of product indicia corresponding to the given product is visually distinct from each of the plurality of product indicia corresponding to another product.

3. The method of claim 2, wherein each of the plurality of product indicia is visually distinct from each of the plurality of product indicia corresponding to another product based upon each of the plurality of product indicia being displayed using at least one of: (a) a certain color; (b) a certain shape; (c) a certain alphanumeric sequence; and (d) any combination thereof.

4. The method of claim 1, wherein:
   the shopping data further comprises at least for each of the plurality of products an identification of an order fulfillment facility from where an order for the product was fulfilled; and
   the product graph is generated such that each of the plurality of product indicia is displayed in such a manner as to identify the order fulfillment facility from where the order for the corresponding product was fulfilled.

5. The method of claim 4, wherein each of the plurality of product indicia is displayed in such a manner as to identify the order fulfillment facility from where the order for the corresponding product was fulfilled by being displayed using at least one of: (a) a certain color; (b) a certain shape; (c) a certain alphanumeric sequence; and (d) any combination thereof.

6. The method of claim 5, wherein each order fulfillment facility is represented using at least one of: (a) a distinct color; (b) a distinct shape; (c) a distinct alphanumeric sequence; and (d) any combination thereof.

7. The method of claim 1, wherein the shopping data comprises at least data obtained from a plurality of online shopping baskets.

8. The method of claim 1, wherein each of the plurality of products is represented as a respective SKU.

9. The method of claim 1, wherein the determining for each of the plurality of products an affinity of the product to each other product of the plurality of products comprises determining the affinity in response to one product being ordered along with another product more than a threshold number of times.

10. The method of claim 9, wherein at least one of: (a) the threshold number of times is an absolute value across a plurality of different orders; (b) the threshold number of times is a percentage value relative to a total number of different orders; and (c) any combination thereof.

11. The method of claim 1, wherein the shopping data comprises at least one of: (a) historic shopping data; (b) real-time shopping data and (c) any combination thereof.

12. A computer program product comprising a non-transitory computer readable storage medium having program instructions embodied therewith, the program instructions executable by a device to cause the device to:
obtain shopping data for a plurality of products, the shopping data comprising at least for each of the plurality of products an identification of each other product of the plurality of products, if any, which had been ordered along with the product;
determine for each of the plurality of products, based at least in part upon the shopping data, an affinity of the product to each other product of the plurality of products, if any, which had been ordered along with the product;
generate a product graph, the product graph comprising at least: (a) a plurality of product indicia, wherein each of the plurality of product indicia corresponds to one of the plurality of products, each of the plurality of product indicia having at least a visual attribute indicative of a location, wherein a different location is represented with a different visual attribute; and (b) a plurality of affinity indicia, wherein each of the plurality of affinity indicia corresponds to one of the determined affinities and wherein each of the plurality of affinity indicia connects two of the plurality of product indicia corresponding to two of the plurality of products that had been ordered together;
assign each of the plurality of products into one of a plurality of clusters represented in three-dimensions, wherein each of the clusters corresponds to a type of product;
cause, utilizing a force directed graphing tool, dragging of some of the plurality of clusters to separate the plurality of clusters;
assign to each of the clusters a bounding rectangle defined by two-dimensional x-y display coordinates, wherein the product graph is generated such that each of the plurality of product indicia in the product graph is displayed in a respective cluster within the bounding rectangle of the respective cluster;
cause displaying of the product graph, wherein a presence of an affinity indicia that connects two of the plurality of product indicia, representing the at least two products, having different visual attributes from one another visually signals an order split, wherein the product graph shows the plurality of product indicia with edges linking at least some of the plurality of product indicia; and
aid in co-locating of the at least two products of the plurality of products in an order fulfillment facility based on the presence of the affinity indicia.

13. The computer program product of claim 12, wherein:
the product graph is generated such that each of the plurality of product indicia corresponding to a given product is visually the same as one another and such that each of the plurality of product indicia corresponding to the given product is visually distinct from each of the plurality of product indicia corresponding to another product; and
each of the plurality of product indicia is visually distinct from each of the plurality of product indicia corresponding to another product based upon each of the plurality of product indicia being displayed using at least one of: (a) a certain color; (b) a certain shape; (c) a certain alphanumeric sequence; and (d) any combination thereof.

14. The computer program product of claim 12, wherein:
the shopping data further comprises for each of the plurality of products an identification of an order fulfillment facility from where an order for the product was fulfilled;
the product graph is generated such that each of the plurality of product indicia is displayed in such a manner as to identify the order fulfillment facility from where the order for the corresponding product was fulfilled;
each of the plurality of product indicia is displayed in such a manner as to identify the order fulfillment facility from where the order for the corresponding product was fulfilled by being displayed using at least one of: (a) a certain color; (b) a certain shape; (c) a certain alphanumeric sequence; and (d) any combination thereof; and
each order fulfillment facility is represented using at least one of: (a) a distinct color; (b) a distinct shape; (c) a different alphanumeric sequence; and (d) any combination thereof.

15. A computer-implemented system for aiding co-location of at least two products, the system comprising:
a processor; and
a memory storing computer readable instructions that, when executed by the processor, implement:
obtaining shopping data for a plurality of products, the shopping data comprising at least for each of the plurality of products an identification of each other product of the plurality of products, if any, which had been ordered along with the product;
determining for each of the plurality of products, based at least in part upon the shopping data, an affinity of the product to each other product of the plurality of products, if any, which had been ordered along with the product;
generating a product graph, the product graph comprising at least: (a) a plurality of product indicia, wherein each of the plurality of product indicia corresponds to one of the plurality of products, each of the plurality of product indicia having at least a visual attribute indicative of a location, wherein a different location is represented with a different visual attribute; and (b) a plurality of affinity indicia, wherein each of the plurality of affinity indicia corresponds to one of the determined affinities and wherein each of the plurality of affinity indicia connects two of the plurality of product indicia corresponding to two of the plurality of products that had been ordered together;

assigning each of the plurality of products into one of a plurality of clusters represented in three-dimensions, wherein each of the clusters corresponds to a type of product;

causing, utilizing a force directed graphing tool, dragging of some of the plurality of clusters to separate the plurality of clusters;

assigning to each of the clusters a bounding rectangle defined by two-dimensional x-y display coordinates, wherein the product graph is generated such that each of the plurality of product indicia in the product graph is displayed in a respective cluster within the bounding rectangle of the respective cluster;

causing displaying of the product graph, wherein a presence of an affinity indicia that connects two of the plurality of product indicia, representing the at least two products, having different visual attributes from one another visually signals an order split, wherein the product graph shows the plurality of product indicia with edges linking at least some of the plurality of product indicia; and aiding in co-locating of the at least two products of the plurality of products in an order fulfillment facility based on the presence of the affinity indicia, wherein the shopping data includes at least real-time orders received via a website.

16. The system of claim 15, wherein:

the product graph is generated such that each of the plurality of product indicia corresponding to a given product is visually the same as one another and such that each of the plurality of product indicia corresponding to the given product is visually distinct from each of the plurality of product indicia corresponding to another product; and each of the plurality of product indicia is visually distinct from each of the plurality of product indicia corresponding to another product based upon each of the plurality of product indicia being displayed using at least one of: (a) a certain color; (b) a certain shape; (c) a certain alphanumeric sequence; and (d) any combination thereof.

17. The system of claim 15, wherein:

the shopping data further comprises for each of the plurality of products an identification of an order fulfillment facility from where an order for the product was fulfilled;

the product graph is generated such that each of the plurality of product indicia is displayed in such a manner as to identify the order fulfillment facility from where the order for the corresponding product was fulfilled;

each of the plurality of product indicia is displayed in such a manner as to identify the order fulfillment facility from where the order for the corresponding product was fulfilled by being displayed using at least one of: (a) a certain color; (b) a certain shape; (c) a certain alphanumeric sequence; and (d) any combination thereof; and each order fulfillment facility is represented using at least one of: (a) a distinct color; (b) a distinct shape; (c) a distinct alphanumeric sequence; and (d) any combination thereof.

* * * * *